United States Patent [19]

Bhat et al.

[11] Patent Number: 5,802,232

[45] Date of Patent: Sep. 1, 1998

[54] BONDED STRUCTURE WITH PORTIONS OF DIFFERING CRYSTALLOGRAPHIC ORIENTATIONS, PARTICULARLY USEFUL AS A NON LINEAR OPTICAL WAVEGUIDE

[75] Inventors: Rajaram Bhat, Middletown; Catherine Genevieve Caneau, Red Bank; Mark A. Koza, Colonia; Sung-Joo Yoo, Long Branch, all of N.J.

[73] Assignee: Bell Communications Research, Inc., Morristown, N.J.

[21] Appl. No.: 602,391

[22] Filed: Feb. 16, 1996

[51] Int. Cl.[6] ................................................. G02B 6/00
[52] U.S. Cl. ................................................. 385/122
[58] Field of Search ........................ 385/4, 18, 12, 385/121–129

[56] References Cited

U.S. PATENT DOCUMENTS

| | | | |
|---|---|---|---|
| 4,733,927 | 3/1988 | Jackson et al. | 385/129 |
| 4,789,642 | 12/1988 | Lorenzo et al. | 385/132 X |
| 5,157,754 | 10/1992 | Bierlein et al. | 385/129 X |
| 5,207,864 | 5/1993 | Bhat et al. | 156/633 |
| 5,359,617 | 10/1994 | Kano et al. | 372/45 |
| 5,434,700 | 7/1995 | Yoo | 359/332 |
| 5,453,325 | 9/1995 | Hung et al. | 385/130 X |

OTHER PUBLICATIONS

Brackett et al., "A scalable multiwavelength multihop optical network: a proposal for research on all-optical networks," *Journal of Lightwave Technology*, vol. 11(1993) pp. 736–753 (No Month).

Alexander et al., "A Precompetitive Consortium on Wide-Band All-Optical Networks," *Journal of Lightwave Technology*, vol. 11, (1993), pp. 714–735 (No Month).

Angell et al., "Growth of alternating <100>/<111>-oriented II-VI regions for quasi-phase-matched nonlinear optical devices on GaAs substrates," *Applied Physics Letters*, vol. 64, 1994, pp. 3107–3109 (No Mo).

Yoo et al., "Quasi-phase-matched second-harmonic generation in AlGaAs waveguides with periodic domain inversion achieved by wafer-bonding," *Applied Physics Letters*, vol. 66, Jun., 1995, pp. 3410–3412.

Yoo et al., "Wavelength conversion by quasi-phase-matched difference frequency generation in AlGaAs waveguides," *OFC '95, Optical Fiber Communication: Postdeadline Papers*, Feb. 26–Mar. 3, 1995, San Diego, pp. PD14–2—PD14–5.

Lo et al., "Bonding by atomic rearrangement of InP/InGaAsP 1.5 μm wavelength lasers on GaAs substrates," *Applied Physics Letters*, vol. 58, 1991, pp. 1961–1963 (No Month).

Soldano et al., "Optical Multi-Mode Inteference Devices Based on Self-Imaging: Principles and Application," *Journal of Lightwave Technology*, vol. 13, 1995, pp. 615–627 (No Month).

Bortz et al., "Increased acceptance bandwidth for quasi-phasematched second harmonic generation in LiNbO$_3$ waveguides," *Electronics Letters*, vol. 30, 1994, pp. 34, 35 (No Month).

*Primary Examiner*—Akm E. Ullah
*Attorney, Agent, or Firm*—Joseph Giordano; Loria Yeadon

[57] ABSTRACT

A waveguide having alternating regions of different crystallographic orientations, thereby providing quasi-phase-matching for a non-linear frequency conversion, in which two wafers with epitaxial layers thereon are bonded together having different, preferably opposed, crystallographic orientations. One wafer is etched away, and a grating is etched such that one part of the grating has the orientation of one wafer and the other part has the orientation of the other wafer. Thereafter, a waveguide structure is epitaxially deposited upon the differentially oriented template so that the waveguide is differentially oriented in its axial direction. Thereby, quasi-phase-matching non-linear effects can be achieved.

22 Claims, 6 Drawing Sheets

A - WAFER

B - WAFER

BONDED STRUCTURE WITH PORTIONS OF DIFFERING CRYSTALLOGRAPHIC ORIENTATIONS, PARTICULARLY USEFUL AS A NON LINEAR OPTICAL WAVEGUIDE

GOVERNMENT INTEREST

The invention was made partially with government funding under contract MDA-972-95-3-0027 from the Advanced Research Projects Agency.

FIELD OF THE INVENTION

The invention generally relates to semiconductor optical devices. In particular, the invention relates to non-linear frequency converters and their method of making.

BACKGROUND OF THE INVENTION

The public telephone network is being increasingly implemented on a backbone of optical fibers. Although the fiber optic network was originally conceived as replacing electrical cables on a point-to-point basis with optical/electrical converters at the ends of each link, much recent research and development has centered on an all-optical network. In particular, as described by Brackett et al. in "A scalable multiwavelength multihop optical network: a proposal for research on all-optical networks," *Journal of Lightwave Technology*, vol. 11, 1993, pp. 736–753, an optical fiber can convey multiple data signals on respective optical carriers of different optical wavelengths. A similar system is described by Alexander et al. in "A Precompetitive Consortium on Wide-Band All-Optical Networks," *Journal of Lightwave Technology*, vol. 11, 1993, pp. 714–735. At switching nodes in the networks, the wavelength channels can be switched in different directions according to their wavelength. Thereby, electro-optical conversion need be performed only at the terminals of the network.

However, such all-optical networks as described above are limited to a number of terminals generally equal to the number of wavelength channels on the networks. The number of channels is presently limited to about twenty because of the need for optical fiber amplifiers of relatively small bandwidth and because of frequency variations between end terminals. To further expand the communication network, the optical frequencies must be reused. As described by Yoo in U.S. Pat. No. 5,434,700 and by Antoniades et al. in U.S. patent application Ser. No. 08/568,037, filed Dec. 6, 1995, a straightforward frequency reuse involves multiple optical networks or network portions linked by frequency converters that can change the frequency of an optical carrier without the need to convert its conveyed data to electrical form.

This patent to Yoo, incorporated herein by reference, describes quasi-phase-matching in a semiconductor waveguide. A basic problem with all-optical frequency conversion is that the non-linear optical coefficients are quite small, thus requiring a long interaction length between an input signal wave and a high-intensity pump signal wave to produce an output signal of a different frequency. However, the pump and the data waves involved in the conversion have significantly different frequencies and, because of the usual dispersion in a non-linear material, experience different effective dielectric constants. As a result, the pump, input, and output signals fall out of phase over a length called the coherence length $l_C$. While in one coherence length the power in the pump wave is being converted from the pump signal to the input and output signals, in the following coherence length the power is being converted in the opposite direction. As a result, the effective conversion length is limited to one coherence length, which is not enough because of the low non-linear conversion efficiency. This problem occurs in many applications of non-linear optical conversions, some of which are described below.

Figure 1:
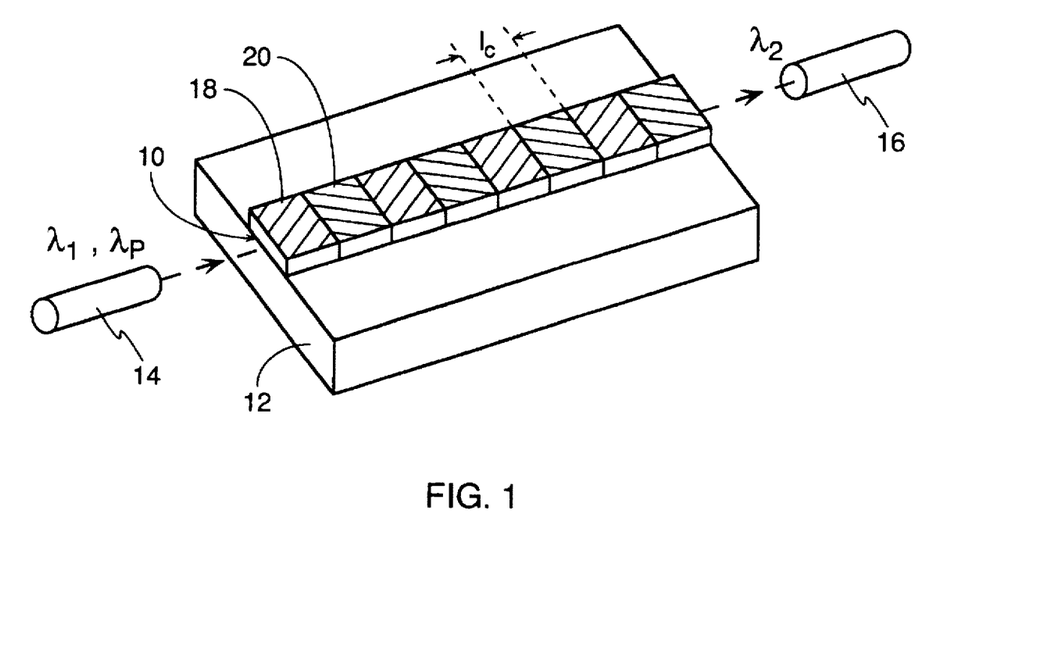
FIG. 1 is a perspective view of a quasi-phase-matched semiconductor waveguide formed on a substrate and useful for frequency conversion.

Quasi-phase-matching circumvents this problem by modulating the non-linearity. As illustrated in the perspective view of FIG. 1, a semiconductor waveguide 10 is formed on a semiconductor substrate 12 to receive from an input fiber 14 an input data signal on an optical carrier at a wavelength $\lambda_1$ and an intense pump signal at a wavelength $\lambda_P$ and to transmit to an output fiber 16 an output data signal on an optical carrier at a wavelength $\lambda_2$. The semiconductor waveguide 10 includes alternating regions 18, 20 having different non-linear coefficients. Preferably each of the regions 18, 20 has a length equal to the coherence length $l_C$ although the fundamental requirement is that the nominal period of the alternating regions 18, 20 equals $2 \cdot l_C$. The condition of equal lengths will be assumed in the following discussion since it provides more efficient conversion.

Non-linear optical conversion requires that the non-linear material possess a non-centrosymmetric structure. In other words, a crystalline structure with inversion symmetry will not exhibit optical non-linearity. Lithium niobate and zincblende-structure semiconductors are examples of non-centrosymmetric materials, whereas silicon is an example of a centrosymmetric material with a diamond crystal structure that yields no optical non-linearity. Efficient non-linear conversion must employ non-linear materials in a way that phase matching can occur. Quasi-phase-matching utilizes modulation of the non-linearity at each coherence length so as to compensate the phase mismatch between interacting waves. This modulation of the non-linearity can be achieved by changing the crystal orientation. Lithium niobate, a popular material for non-linear effects, can be electrically poled in alternating stripes into two anti-parallel polarization states. In zincblende semiconductors, such poling is not easy, and other methods such as the one disclosed here must be utilized. In particular, a crystal with a [0,0,1] orientation and another crystal with a [0,0,−1] orientation, where the two crystals possess a common [1,1,0] axis, manifest optical non-linearities equal in magnitude but opposite in sign. The non-linear semiconductor waveguide of the Yoo patent is composed of a III-V semiconductor, such as AlAs, having a zincblende crystal structure in which a [0,0,1] orientation can be distinguished from a [0,0,−1] orientation because the Al and the As occupy non-equivalent sites. The related tetrahedral structure for silicon places silicon at both of these sites so that silicon possesses a centrosymmetric structure resulting in no non-linearity and thus cannot be used for non-linear optical conversion.

Figure 2:
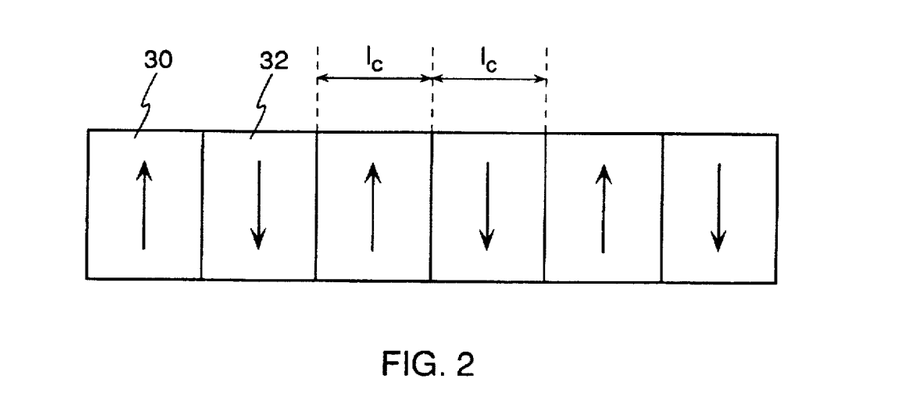
FIG. 2 is a schematical cross-sectional view of a quasi-phase-matched transmission and interaction path.

The preferred crystallographic structure for a non-linear waveguide is illustrated in cross section in FIG. 2 and includes alternating regions 30, 32 each of length equal to the coherence length $l_C$ and having an alternating structural anisotropy, indicated by the arrows pointing in opposite directions. The alternating anisotropy can be obtained if the first regions 30 have a [0,0,1] zincblende crystalline orientation and the second regions 32 have an approximate [0,0,−1] orientation. The two sets of regions 30, 32 can have the same composition, e.g., AlAs.

The non-linear interaction discussed here relies on the second order susceptibility tensor $\chi_{ijk}^{(2)}$, and the non-linear generation is given by relations of the form $$E_i^{\omega 2} = \chi_{ijk}^{(2)} E_j^{\omega} E_k^{\omega p} \qquad (1)$$

In the case of the zincblende structure and with a few further simplifications, the non-linear susceptibilities of the two regions 30, 32 are given respectively by $\chi$, and $-\chi$. That is, the sign of the non-linear susceptibility reverses between the two regions 30, 32. However, in this design the reversal of sign occurs with the same period over which the interacting waves (pump, input signal, and output signal) experience reversal of their relative phase because of dispersion. Hence, in the alternating structure the non-linear power flow is always from the pump wave $\omega_p$ to the input and output signals $\omega_1, \omega_2$. This well known effect is called quasi-phase-matching although the effect is somewhat more complex than indicated by the above simple derivation.

Achieving the alternating crystallographic alignment of FIG. 2 is a difficult task. The high optical quality required of the semiconductor waveguide usually means that it is grown epitaxially upon a mono-crystalline substrate, as is well known in the art. However, in almost all forms of epitaxial growth, the orientation of the grown material is precisely aligned with that of the substrate. Angell et al. have suggested epitaxially forming one type of quasi-phase-matched waveguide in "Growth of alternating <100>/<111>-oriented II–VI regions for quasi-phase-matched nonlinear optical devices on GaAs substrates," *Applied Physics Letters*, vol. 64, 1994, pp. 3107–3109. This structure, however, does not have the alternating inverted structure but instead regions of [1,0,0] orientation and regions of [1,1,1] orientation. This article did not report on the final waveguide, and the utility of this approach is uncertain. Further, this structure depends on the peculiar tendency of CdTe to form with a [1,1,1] orientation when grown on [1,0,0]-oriented GaAs, and the technique is thus limited to particular material combinations.

SUMMARY OF THE INVENTION

The invention can be summarized as a method of forming a quasi-phase-matched waveguide or other structure having alternating crystallographic domains involving bonding together two wafers having differing non-linear susceptibilities or differing crystallographic orientations, etching away one of the wafers, and patterning a grating structure composed partially from one wafer and partially from the other wafer, and regrowing at least part of a waveguide structure over the grating structure having the alternating crystallography of the underlying material.

DETAILED DESCRIPTION OF THE PREFERRED EMBODIMENTS

We have found that a III–V semiconducting waveguide having periodic inversion of domains can be formed by combining wafer bonding, etching, and regrowth. Such a waveguide is particularly useful for quasi-phase-matching.

The preferred embodiment for fabricating such a structure differs somewhat from that disclosed by Yoo in U.S. Pat. No. 5,434,700 and by Yoo et al. in "Quasi-phase-matched second-harmonic generation in AlGaAs waveguides with periodic domain inversion achieved by wafer-bonding," *Applied Physics Letters*, vol. 66, June, 1995, pp. 3410–3412. However, the broadest aspects of the invention are described there. A version of this work has also been reported by Yoo et al. in "Wavelength conversion by quasi-phase-matched difference frequency generation in AlGaAs waveguides," *OFC '95, Optical Fiber Communication: Postdeadline Papers*, Feb. 26–Mar. 3, 1995, San Diego, paper #PD-14.

Figure 3:
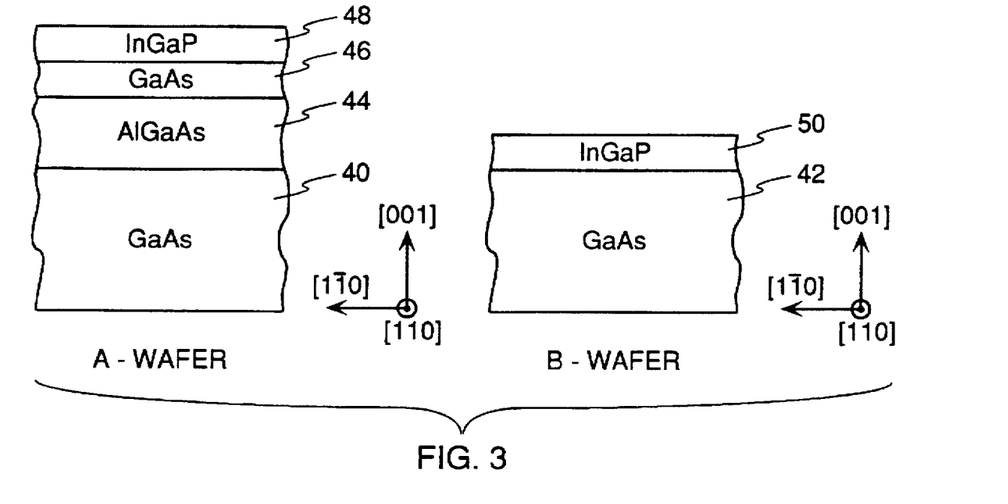
FIGS. 3 and 4 are cross-sectional views showing the bonding together of two exemplary wafer structures.

The process is described with reference to the following cross-sectional views. As shown in FIG. 3, two GaAs wafer substrates 40 and 42 are oriented with their [0,0,1] axes upwards for the epitaxial growth by organo-metallic chemical vapor deposition (OMCVD). The other two illustrated axes [1,–1,0] and [1,1,0] are not really relevant for the epitaxy but become important for determining the non-linear susceptibilities of the final structure. On the A-wafer 40 are grown a 1-μm thick $Al_{0.8}Ga_{0.2}As$ etch-stop layer 44, a 0.1-μm thick GaAs layer 46, and a 20-nm thick $In_{0.5}Ga_{0.5}P$ layer 48. Because of the epitaxial growth, all these layers 44, 46, 48 have the same crystalline orientation as the underlying A-wafer 40, that is, [0,0,1] upwards. Likewise, the B-wafer 42 is epitaxially deposited with a second 20-nm thick $In_{0.5}Ga_{0.5}P$ layer 50 having the same upwards [0,0,1] orientation as that of its substrate 42. These compositions are chosen for lattice matching, but thin strained layers are usable with the invention.

Figure 4:
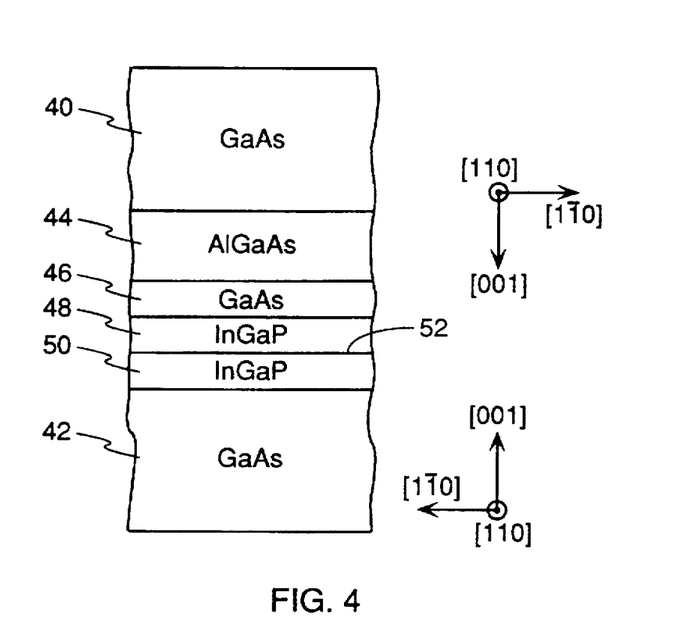

After the A- and B-wafers 40, 42 have been formed with the structure in FIG. 3, they are aligned with their upper surfaces facing each other across a bonding plane 52, as illustrated in FIG. 4, so that their respective [0,0,1] axes are opposed to each other. Also the two wafers are azimuthally oriented so that their respective [1,1,0] axes are parallel and their [1,–1,0] axes are anti-parallel. However, this alignment is not precise at the atomic level.

The two wafers are then bonded together. First, they are joined by van der Waals bonding at room temperature. In this process, the wafer surfaces to be bonded are washed with a strongly caustic liquid and then rinsed and dried. To produce hydrophobic surfaces, the caustic liquid can be concentrated HF. Such hydrophobic surfaces have minimal native oxides. To produce hydrophilic surfaces, the caustic liquid can be $H_2SO_4$. Such hydrophilically treated surfaces have a native oxide because of the caustic treatment. The two surfaces are aligned, as described above, and gently pressed together. Van der Waals bonding thereafter holds the wafers together. Hydrophilic surfaces produce stronger van der Waals bonding but yield poor interfaces due to the oxides. Hydrophobic surfaces produce weaker van der Waals bonding, but yield better interfaces.

After the van der Waals bonding, the wafers are fused together by a process for bonding by atomic rearrangement (BAR), as disclosed by Bhat et al. in U.S. Pat. No. 5,207,864 and by Lo et al. in "Bonding by atomic rearrangement of InP/InGaAsP 1.5 μm wavelength lasers on GaAs substrates," *Applied Physics Letters*, vol. 58, 1991, pp. 1961–1963. In the previously cited patent, Yoo discusses the BAR process, as applied to quasi-phase-matched waveguides. In the BAR process, the wafers are held together under moderate pressure in a reducing atmosphere of hydrogen while the temperature is raised to about that for OMCVD growth of the materials, that is, a temperature at which the atoms in the crystals can bond to form a crystal but can also rearrange on the interfacial surface. For InP-based materials, this temperature is about 650° C. The BAR process effectively bonds the two wafers together. The described process differs from that previously reported in that the BAR process is effected between the two layers 48 and 50 of the same InGaP composition, which greatly reduces the number of dislocations at the interface.

It is noted that the BAR bonding does not render the two wafers 40, 42 epitaxial to each other because of the inevitable small misalignment between the wafers, which may amount to less than 5°.

Figure 5:
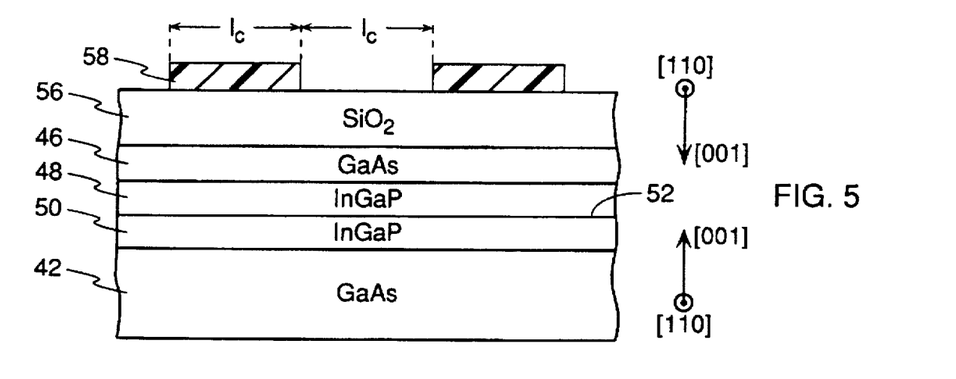
FIGS. 5 through 8 are cross-sectional views showing the formation in the bonded wafer structure of FIG. 4 of an epitaxial template having alternating domains of different crystallographic orientation.
Figure 6:
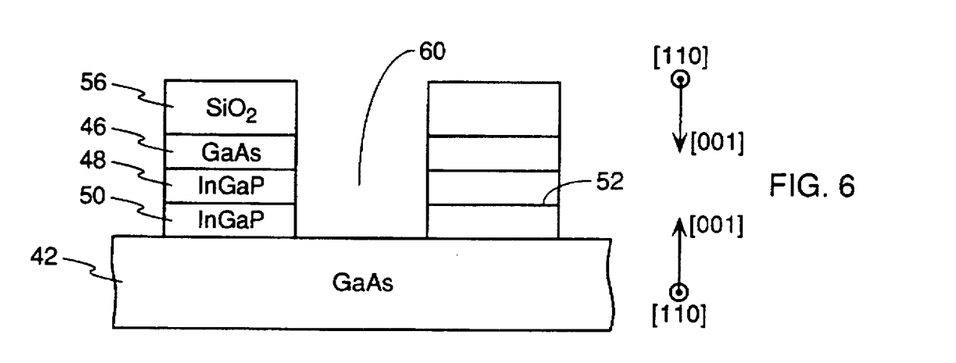

After the BAR process, the A-wafer GaAs substrate 40 is removed by a selective wet etching at room temperature using an etching solution of 8 volumetric parts of a mixture of $H_2O$ and monohydrate citric acid (1:1 by weight) and 1 part of $H_2O_2$ that stops at the AlGaAs etch-stop layer 44, and then the etch-stop layer 44 is removed by another selective wet etch with HF to produce the base structure illustrated in FIG. 5. A 150 nm-thick mask layer 56 of $SiO_2$ is plasma-CVD deposited over the base structure. Photoresist 58 is deposited on the structure and photolithographically defined into a grating pattern having alternating mask areas and apertures each of width equal to the coherence length $l_C$. The exposed underlying $SiO_2$ is etched with a dry-plasma etch of $C_2F_6$, and the photoresist is stripped to leave the $SiO_2$ layer 56 formed into a hard mask. The exposed GaAs layer 46 is selectively etched with $H_3PO_4:H_2O_2:H_2O$ (1:1:38 by volume), and then the exposed InGaP layers 48, 50 are selectively etched with $HCl:H_3PO_4$ (1:10 by volume), which stops at the GaAs substrate 42. The etching produces a grating structure having trenches 60, as illustrated in FIG. 6.

Figure 7:
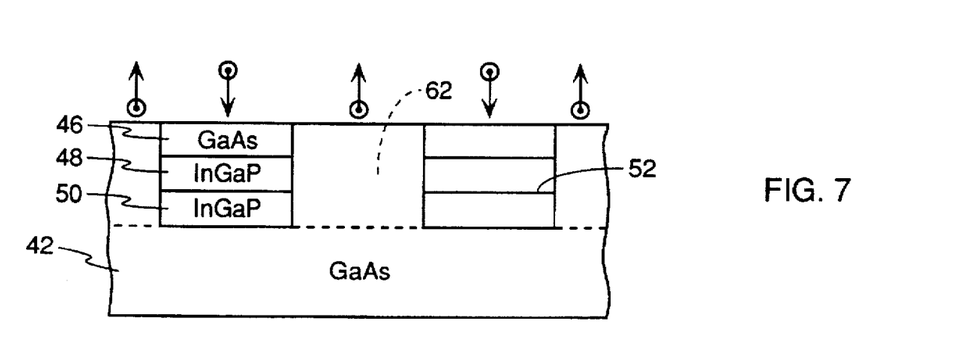

In a selective regrowth process, OMCVD is used to epitaxially deposit GaAs into the trenches 60 to form inverted-domain GaAs plugs 62, as illustrated in FIG. 7, substantially filling the trenches 60. Because these plugs 62 are epitaxially formed over the substrate 42 they grow with the crystallographic orientation of the substrate 42. The GaAs growth is selective because the $SiO_2$ material of the hard mask 56 prevents appreciable deposition thereover in the OMCVD process.

The $SiO_2$ layer 56 is removed with HF to leave a substantially planar surface of GaAs with the originally grown GaAs layer 46 having its [0,0,1] axis pointing downwards and the regrown GaAs plug 62 having its [0,0,1] axis pointing upwards. However, the regrowth of the plugs 62 does not leave a precisely level surface of sufficient quality to serve as an epitaxial template for growing an optical waveguide. Accordingly, a planarization layer 64 is deposited by OMCVD. This layer 64 includes a large number of AlGaAs layers, with alternating layers being rich respectively in Ga and Al, in particular, 120 periods of alternating layers of 4 nm of GaAs and 6 nm of AlAs. The planarization layer 64 provides a smooth surface with alternating domains 66, 68 having the crystallographic orientation of the underlying original GaAs layer 46 or of the regrown GaAs plug 62. Because the two wafers 40, 42 are not precisely aligned, the crystallography of the domains 66, 68 is not precisely inverted but is sufficient for the desired quasi-phase-matching. This completes the formation of a template for the subsequent epitaxial formation of a waveguide with the domains of alternating orientation following those of the underlying portions of the template.

Figure 9:
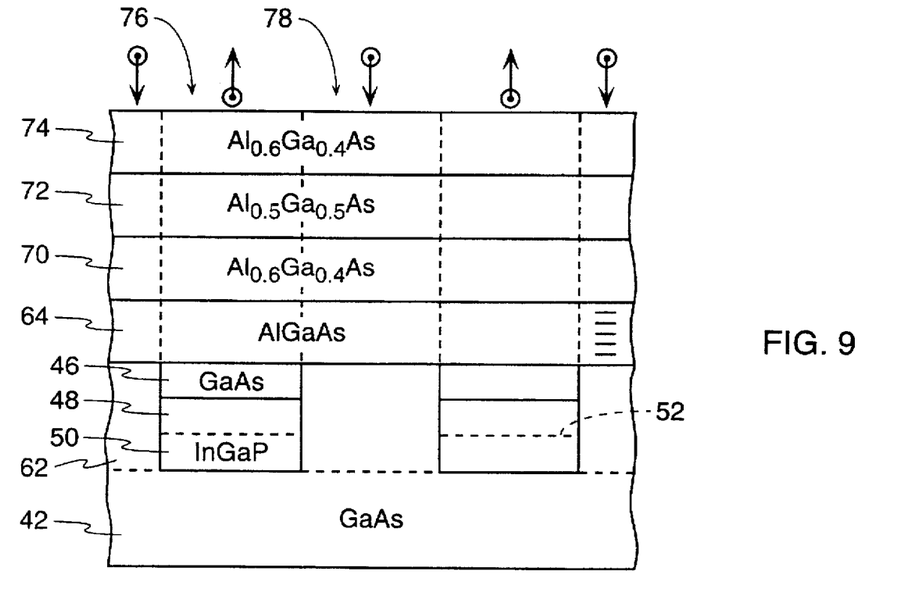
FIG. 9 is a cross-sectional view showing a quasi-phase-matched waveguide formed on the template of FIG. 8.

A waveguide structure is then epitaxially grown over the template by OMCVD. The waveguide structure includes a 2 μm-thick lower cladding layer 70 of $Al_{0.6}Ga_{0.4}As$, a 1 μm-thick core layer 72 of $Al_{0.5}Ga_{0.5}As$, and a 2 μm-thick upper cladding layer 74 of $Al_{0.6}Ga_{0.4}As$. Pulsed growth of the three layers 70, 72, 74 of the waveguide structure is preferred in order to improve the morphology by smoothing the surface. In this technique, growth is periodically interrupted by stopping the flow of Al- and Ga-precursor gases for a short time, ten seconds in the example. Importantly, the epitaxial growth causes the alternating sections of the waveguide structure 76, 78, each of width $l_C$, to continue the periodic template orientation and thus to have alternately opposed crystallographic orientations. Thus, the sign of any second order non-linearity is reversed between the two sections, thereby providing quasi-phase-matching.

The waveguide needs to be laterally defined. One method includes masking the wafer deposited with the structure defined above to define a rib-loaded waveguide, similar to that shown in FIG. 1 extending along the [1,−1,0] direction. The non-masked portions away from the rib waveguide are etched by a diffusion-limited etchant $HCl:H_2O_2:H_2O$ (80:4:1 by volume).

Experiment

Figure 10:
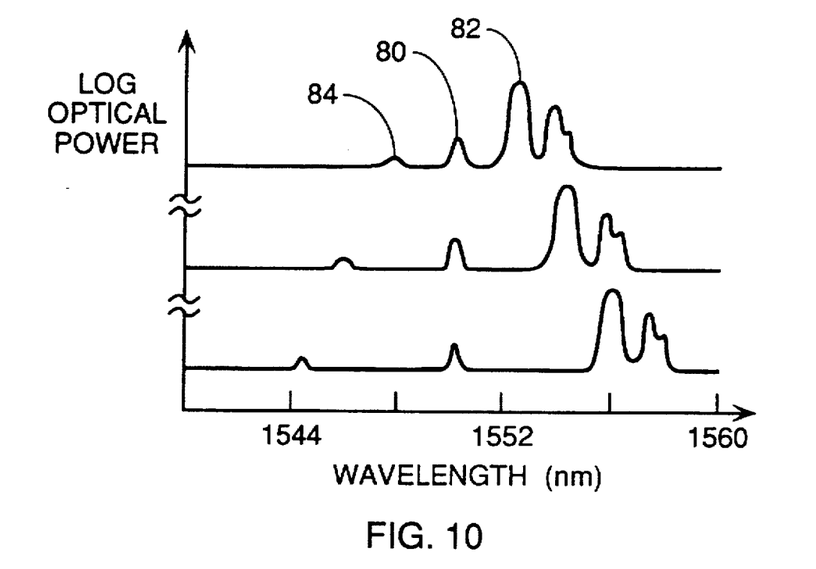
FIG. 10 is a graph showing the non-linear response as a function of wavelength for the quasi-phase-matched waveguide of FIG. 9.

A quasi-phase-matched waveguide was formed according to the above process having a period ($2 \cdot l_C$) of 4 μm and extending along 3 mm. The waveguide was used for difference-frequency generation utilizing a tunable NaCl:OH (F-center) laser for the input signal and a $Ti:Al_2O_3$ laser for the pump wave. The pump wave was at 775 nm, and the input waves were selected to be at 1548, 1546, and 1544 nm for three parts of the experiments. The traces shown in FIG. 10 correspond to the different input signals and show the logarithm of the output power from the quasi-phase-matched waveguide that is irradiated with the input and pump signals. The signal 80 at 1550 nm is the second order diffraction response of the spectrometer for the pump signal which appears at $2 \cdot \lambda_P$. The wave form of signal 82 represents a complex input signal $\omega_1$ that is tunable between the traces. In difference-frequency generation, the output signal $\omega_2$ is a mirror image of the input signal $\omega_1$ reflected across half the pump frequency $\omega_P/2$ or twice the pump wavelength $2 \cdot \lambda_P$. The output signals 84 follow this relationship with respect to the input signals 80 and the second-order diffraction pump signal 82. It is noted that the wavelength imaging of an optical signal with a complex wavelength distribution is useful for correcting dispersion that a long optical fiber introduces into a signal it transmits.

At least two types of phase matching are possible. For the difference-frequency generation discussed above, they are:

type I—a TM (transverse magnetic) pump wave mixing with a TE (transverse electric) input signal wave generating a TE output converted signal; and type II—a TE pump wave mixing with a TE (or TM) input signal wave generating a TM (or TE) converted output wave.

The article by Yoo in *Applied Physics Letters* has suggested using this structure for second harmonic generation. For this case there are two types of possible phase matching:

type I—a TE fundamental wave mixing with itself and thereby generating a TM fundamental second-harmonic wave; and type II—a TE fundamental wave mixing with a TM fundamental wave and thereby generating a TE second-harmonic wave.

In terms of difference-frequency generation, type II is preferred because polarization diversity is achieved since the TE mode is converted to a TM mode and vice versa) and because the conversion efficiency is insensitive to polarization since the two processes of TE mode converted to TM and TM converted to TE are equal in strength and they occur simultaneously. This arrangement is also advantageous for integrating a laser to provide a TE pump wave.

In terms of monolithically integrating a laser with a nonlinear waveguide generating a second harmonic, type I is advantageous because semiconductor lasers emit TE radiation unless the gain media employ tensile-strained quantum wells.

Figure 11:
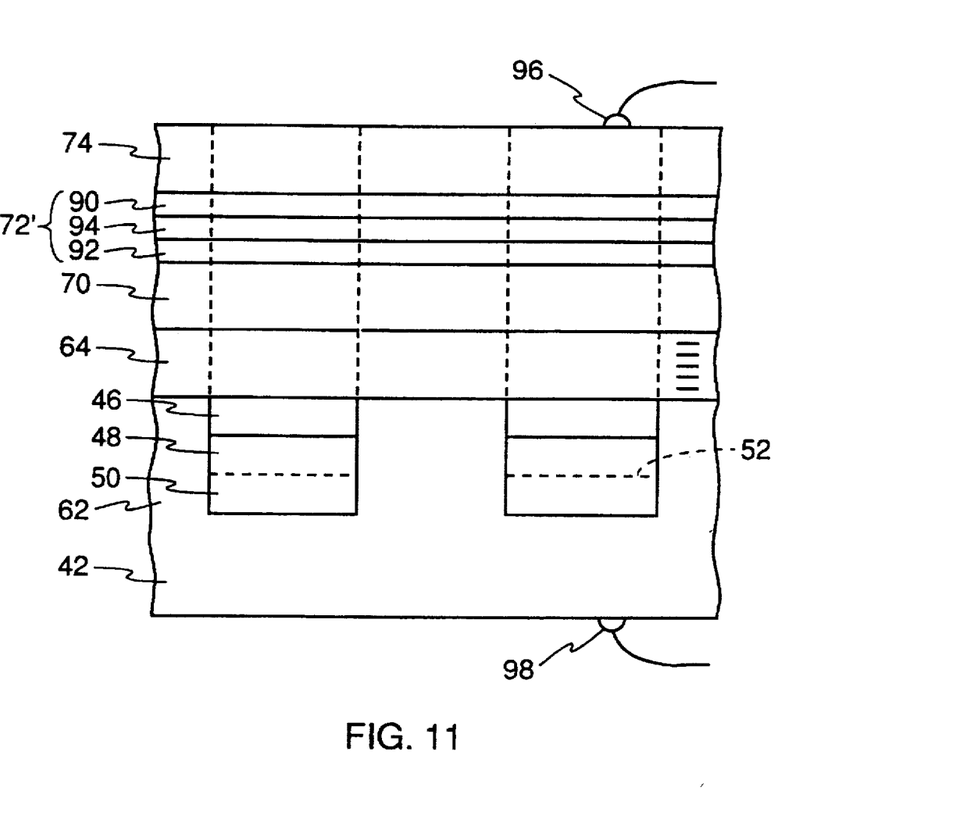
FIGS. 11 and 12 are cross-sectional views of two embodiments of the invention incorporating an active layer into the waveguide over a crystallographically differentiated substrate.

The monolithic integration of a laser is easily accomplished with the invention, as illustrated in the cross section of FIG. 11, by dividing an active core layer 72' into an upper layer 90 of a first conductivity type and a lower layer 92 of a second conductivity type sandwiching an active layer 94, which may include one or more quantum wells. The upper cladding layer 74 is doped to be of the first conductivity type, and at least the lower cladding layer 70 and possibly others of the lower layers 64, 46, 48, 50, 62, 42 are doped to be of the second conductivity type. Electrical contacts 96, 98 are placed above and below the structure sandwiching the active layer 84 to electrically bias the laser to lase at the pump wavelength.

Figure 12:
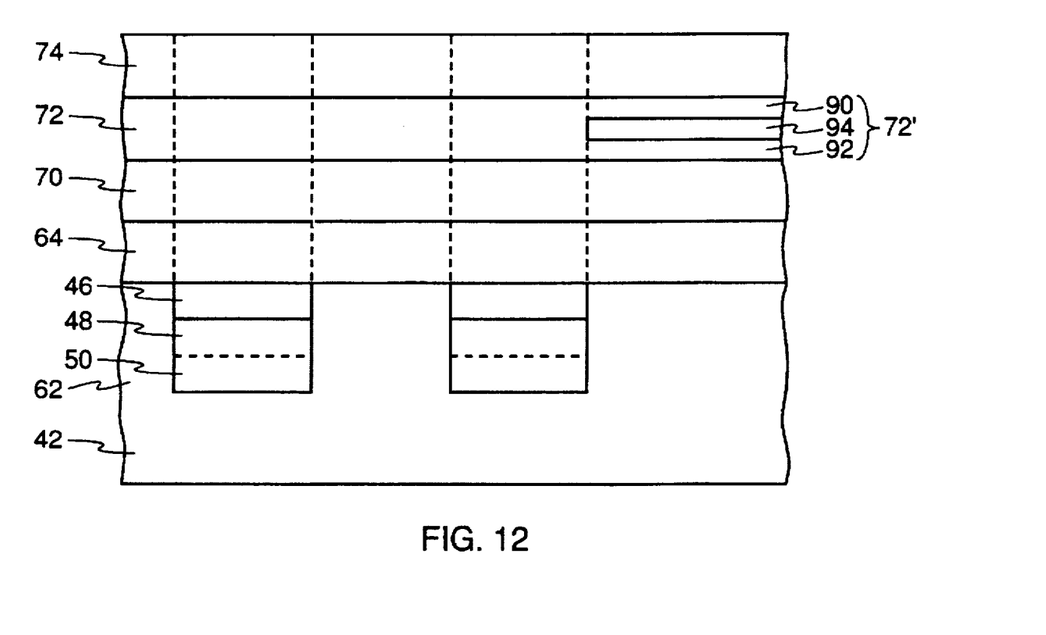

A related structure, illustrated in the cross section of FIG. 12, separates the active core layer 72' having an active layer 84 and not having alternating crystallographic domains from the inactive core layer 72 that lacks an active layer but that is composed of alternating crystallographic domains. The inactive core layer 72 is not differentially doped between its upper and lower parts. Although the active core layer 72' is illustrated as having the crystallographic orientation of the remaining GaAs substrate 42, the structure can be slightly modified so that it has the inverted orientation of the GaAs layer 46.

Figure 13:
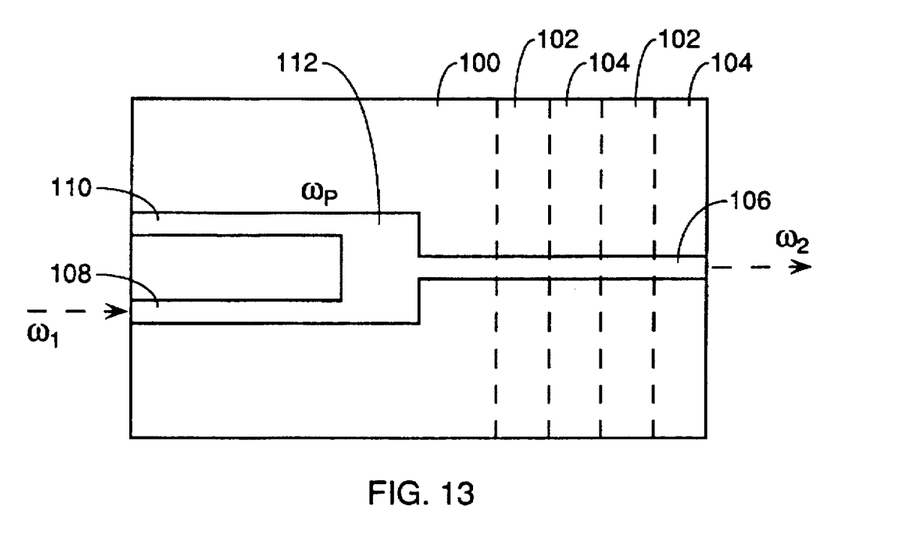
FIG. 13 is a plan view showing a Y-shaped coupling of a waveguide and an active region particularly usable with a parametric wavelength converter.

The functional structure illustrated in FIG. 12 can be adapted to a wavelength converter system, illustrated in plan view in FIG. 13, which is integrated onto an opto-electronic integrated circuit chip 100. The right side of the chip includes alternating crystallographic domains 102, 104 across which an inactive, quasi-phase-matched waveguide 106 is epitaxially formed. The left side of the chip 100 that is not crystallographically differentiated includes an inactive, axially homogeneous semiconductor waveguide 108 and an active semiconductor waveguide 110 configured as a laser, as in the right hand side of FIG. 12. The three waveguides are joined in a coupling region 112.

The active waveguide 110 is designed to lase at the pump frequency $\omega_p$, and the inactive, homogeneous waveguide 108 receives the input signal $\omega_1$. The coupling region combines these two signals onto the quasi-phase-matched waveguide 106, which thereby outputs the frequency-converted output signal $\omega_2$. This configuration is particularly advantageous because the optical signals $\omega_1$, $\omega_2$ do not pass through the active region, thereby avoiding possible attenuation by free-carrier absorption.

The coupling region 112 can be advantageously implemented as a multi-mode inteference filter of the sort described by Soldano et al. in "Optical Multi-Mode Inteference Devices Based on Self-Imaging: Principles and Application," *Journal of Lightwave Technology*, vol. 13, 1995, pp. 615–627. Such a multi-port filter can be designed to have high coupling efficiency between the input waveguide 108 and the quasi-phase-matched waveguide 106 at the input wavelength, e.g. 1550 nm, and simultaneously have high coupling efficiency between the pump waveguide 110 and the quasi-phase-matched waveguide 106 at the pump wavelength, e.g. 775 nm.

Although the invention has been described in terms of a wavelength converter based on difference-frequency generation, the quasi-phase-matched grating of the invention can be applied to other uses, such as the previously described dispersion compensators, noiseless parametric amplifiers, and tunable sources in the visible and the infrared. The Yoo et al. paper describes a second-harmonic generator.

Although a simple periodicity for the grating has been described, the fabrication process can be applied to more complex periodicities, including higher-order periodicities and aperiodic perturbations of the periodicity and even to alternating domains having no readily discernible periods. Bortz et al. disclose in "Increased acceptance bandwidth for quasi-phasematched second harmonic generation in LiNbO$_3$ waveguides," *Electronics Letters*, vol. 30, 1994, pp. 34, 35 a design including long range modulation in the grating.

Periodically inverted crystallographic domains provide simple but effective quasi-phase-matching. However, the grating can be composed of different non-inverted crystallographic orientations, for example [1,0,0] and [1,1,1], since wafer bonding can fuse the disparate orientations. Quasi-phase-matching does not require equal and opposite non-linearities but only a non-linearity modulated with a nominal period of twice the coherence length.

Figure 8:
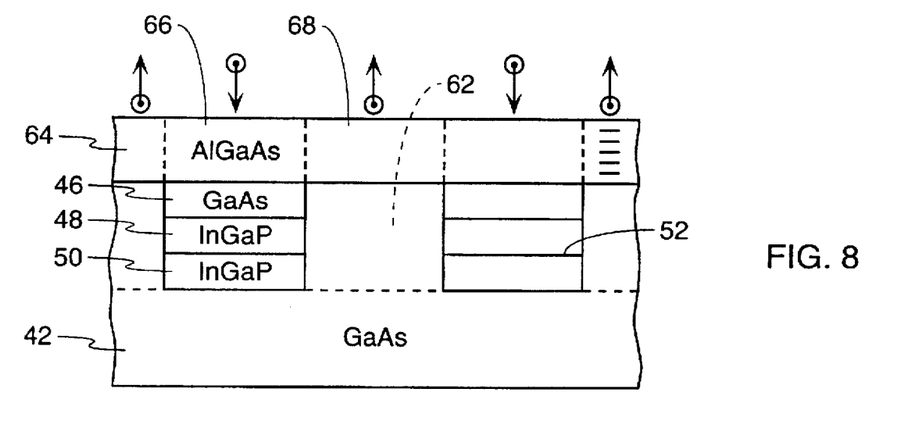

The invention is not limited to the described materials, which are particularly appropriate for frequency converters in a communication network utilizing silica fibers. Other non-centrosymmetric crystalline materials can be used. The two materials constituting the grating need not be the same. The II–VI semiconductor structure ZnSe-ZnCdSe-ZnSe can be grown with neglible lattice mismatch on the GaAs-based template of FIG. 8. The ZnSe waveguide allows a visible coherent source to be implemented by means of second harmonic generation.

The invention thus provides a straightforward method of forming a quasi-phase-matched waveguide for non-linear optical conversion. The method mostly requires standard semiconductor fabrication processes but nonetheless provides an effective semiconductor optical wavelength converter.

What is claimed is:

1. A method of fabricating a sequence of domains of different crystallography, comprising the steps of:

placing together first and second substrates having respective crystalline portions in a relative physical orientation such that said two substrates have substantially differing crystalline orientations;

bonding together said placed together substrates;

forming a patterned mask on top of at least a vertical part of said first substrate;

etching through said patterned mask through said first substrate to form an aperture exposing a part of said second substrate; and epitaxially depositing on over exposed both portions of said first and second substrates one or more upper layers.

2. A method as recited in claim 1, wherein said patterned mask includes a periodic array of apertures.

3. A method as recited in claim 1, wherein a crystallographic direction of said first substrate is opposed to a corresponding crystallographic direction of said second substrate so bonded to said first substrate.

4. A method as recited in claim 1, further comprising forming said upper layers into an optical waveguide.

5. A method as recited in claim 1, wherein said first and second substrates comprise semiconductor materials having a zincblende crystalline structure.

6. A method as recited in claim 1, wherein said first and second substrates have surface portions facing each other in said placing step of substantially a same composition.

7. A method as recited in claim 1, wherein said bonding step comprises a step of bonding by atomic rearrangement.

8. A method as recited in claim 7, wherein said bonding step comprises subjecting surfaces of said substrates to a caustic liquid before said placing step.

9. A method as recited in claim 1, further comprising a step of depositing within said aperture a templating part epitaxial with said second substrate and having a top surface approximately level with a top of a remaining portion of said first substrate.

10. A method of forming a waveguide having domains of alternating crystallographic orientation, comprising the steps of:

epitaxially forming on a first substrate at least one first layer;

epitaxially forming on a second substrate at least one second layer;

bonding together said first and second substrates with said first and second layers facing each other in a relative physical orientation whereby said first and second substrates have differing crystallographic orientations;

etching through at least said first substrate to remove it thereby and to leave a first exposed surface of said at least one first layer;

forming a patterned etching mask on said first exposed surface;

etching through said etching mask portions exposed thereby of at least said one first layer, thereby forming a template having portions of differing crystallographic orientations; and epitaxially forming on said template a waveguide structure having portions with crystallographic orientations corresponding to underlying portions thereof, axial portions of said waveguide structure having differing crystallographic orientations corresponding to underlying portions thereof.

11. A method as recited in claim 10, wherein said substrates and said at least one first and second layers comprise semiconductors having a zincblende crystalline structure.

12. A method as recited in claim 11, wherein said at least one first and second layers comprise respective surface layers having substantially a same composition.

13. A method as recited in claim 11, wherein said patterned etching mask has a periodic pattern of said apertures.

14. A method as recited in claim 13, wherein said differing orientations of said substrates include normal orientation reversed between said substrates.

15. A waveguide structure, comprising:

a crystalline substrate having a non-centrosymmetric crystal structure oriented in a first direction, said substrate having an upper surface and apertures arranged along an axis in said upper surface and extending downwardly therefrom;

a crystalline upper portion joined to said lower portion across said upper surface and non-epitaxial therewith and extending into said apertures and having a non-centrosymmetric crystal structure oriented in a second direction substantially offset from said first direction; and an optical waveguide formed along said axis in at least one of said upper and lower portions and being epitaxial with portions therebeneath.

16. A waveguide structure as recited in claim 15, wherein said substrate and said upper and lower portions comprise semiconductive material having a zincblende crystalline structure.

17. A waveguide structure as recited in claim 16, wherein said substrate includes a lower portion epitaxially formed therewith and wherein said apertures extend partially through said lower portion.

18. A waveguide structure as recited in claim 16, wherein said first and second orientations include anti-parallel orientations.

19. A waveguide structure as recited in claim 16:

wherein said optical waveguide includes a layer of a first conductivity type and a layer of a second conductivity type and an active layer sandwiched therebetween; and further comprising electrical contacts for biasing an electrical path including said layers of said first and second conductivity types and said active layer.

20. A waveguide structure as recited in claim 19, wherein said optical waveguide includes an axial portion with said active layer and another axial portion without an active layer.

21. A method as recited in claim 4, wherein said optical waveguide has portions of differing optical non-linearities.

22. A waveguide structure as recited in claim 15, wherein said optical waveguide has portions arranged along said axis of differing optical non-linearities.

* * * * *